US012255687B2

(12) United States Patent
He et al.

(10) Patent No.: US 12,255,687 B2
(45) Date of Patent: Mar. 18, 2025

(54) REMOTE UNIT, MULTI-BAND DISTRIBUTED SYSTEM AND SIGNAL PROCESSING METHOD

(71) Applicants: PROSE TECHNOLOGIES (SUZHOU) CO., LTD., Suzhou (CN); PROSE TECHNOLOGIES LLC, Mount Olive, NJ (US)

(72) Inventors: Yaoguang He, Suzhou (CN); Bin Zhu, Suzhou (CN); Haijun Min, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 0 days.

(21) Appl. No.: 18/327,703

(22) Filed: Jun. 1, 2023

(65) Prior Publication Data

US 2023/0308184 A1 Sep. 28, 2023

Related U.S. Application Data

(63) Continuation of application No. PCT/CN2022/076746, filed on Feb. 18, 2022.

(30) Foreign Application Priority Data

| Apr. 29, 2021 | (CN) | ......................... 202110471978.6 |
| Apr. 29, 2021 | (CN) | ......................... 202120919537.3 |
| Jun. 30, 2021 | (CN) | ......................... 202110734993.5 |

(51) Int. Cl.
*H04B 10/2575* (2013.01)
*H04B 10/2507* (2013.01)

(52) U.S. Cl.
CPC . *H04B 10/25758* (2013.01); *H04B 10/25073* (2013.01)

(58) Field of Classification Search
CPC . H03F 1/3241; H03F 2200/294; H04B 1/005; H04B 1/0053; H04B 1/0057;
(Continued)

(56) References Cited

U.S. PATENT DOCUMENTS

2010/0165892 A1* 7/2010 Cha ........................ H04W 24/00
370/280
2016/0329957 A1* 11/2016 Schmid .................. H04B 7/155
(Continued)

FOREIGN PATENT DOCUMENTS

| CN | 101207366 A | 6/2008 |
| CN | 102664683 A | 9/2012 |

(Continued)

OTHER PUBLICATIONS

World Intellectual Property Organization (WIPO) International Search Report for PCT/CN2022/076746 May 13, 2022 6 pages (with translation).

*Primary Examiner* — Young T. Tse
(74) *Attorney, Agent, or Firm* — ANOVA LAW GROUP, PLLC

(57) ABSTRACT

A remote unit includes: an optical module configured to receive a signal from an access unit communicatively connected to the remote unit; a power distribution module connected to the optical module and configured to divide the signal received from the optical module into a first component and a second component, the second component having a working band different from that of the first component; a first low noise and high-power amplifier connected to the power distribution module and configured to process the first component; and a second low noise and high-power amplifier connected to the power distribution module and configured to process the second component.

16 Claims, 7 Drawing Sheets

(58) Field of Classification Search
CPC ........ H04B 1/006; H04B 1/0067; H04B 1/38; H04B 1/40; H04B 10/25073; H04B 10/25753; H04B 10/25758; H04B 2001/0408; H04B 2001/0425
USPC ........ 375/219, 257, 296, 297; 370/282, 329, 370/339; 455/78, 80, 82, 84
See application file for complete search history.

(56) References Cited

U.S. PATENT DOCUMENTS

| | | | |
|---|---|---|---|
| 2019/0190152 A1* | 6/2019 | Doudou | H04B 1/0057 |
| 2019/0281478 A1* | 9/2019 | Fu | H04W 16/20 |
| 2019/0393922 A1* | 12/2019 | Nagano | H04B 7/2621 |
| 2022/0053426 A1* | 2/2022 | Ahn | H04W 52/0277 |
| 2022/0190785 A1* | 6/2022 | Patel | H03F 3/195 |

FOREIGN PATENT DOCUMENTS

| | | |
|---|---|---|
| CN | 103067041 A | 4/2013 |
| CN | 204886973 U | 12/2015 |
| CN | 109495902 A | 3/2019 |
| CN | 109639356 A | 4/2019 |
| CN | 110912580 A | 3/2020 |
| CN | 113014275 A | 6/2021 |
| CN | 113541699 A | 10/2021 |

* cited by examiner

REMOTE UNIT, MULTI-BAND DISTRIBUTED SYSTEM AND SIGNAL PROCESSING METHOD

RELATED APPLICATION(S)

This application is a continuation application of PCT Patent Application No. PCT/CN2022/076746 filed on Feb. 18, 2022, which claims priority to Chinese Patent Application No. 202120919537.3 filed on Apr. 29, 2021, to Chinese Patent Application No. 202110471978.6 filed on Apr. 29, 2021, and to Chinese Patent Application No. 202110734993.5 filed on Jun. 30, 2021, with the National Intellectual Property Administration, People's Republic of China, all of which are incorporated herein by reference in entirety.

FIELD OF THE TECHNOLOGY

The present disclosure relates to a communications field, and more specifically to a remote unit, a multi-band distributed system including the remote unit, and a signal processing method used in a multi-band distributed system.

BACKGROUND

With the development of 5G and subsequent communication systems, the increase in signal processing bandwidth and the application of MIMO (multiple input multiple output) have brought pressure and challenges to system transmission and processing, conventional solutions are difficult to achieve; and on the other hand, original 2G, 3G, and 4G systems may not be eliminated in a short time, so coexistence of multiple systems becomes inevitable.

The existing system has the following shortcomings: The remote power amplifier of the traditional analog 2G/3G/4G systems uses the APD (Analog Pre-distortion) technology to ensure the system linearity index and avoid the channel interference. APD (Analog Pre-distortion) can achieve the power amplifier linear compensation of signal bandwidth of tens of megabytes, and can meet the linear requirement of 2G/3G/4G power amplification. For 5G applications, due to the working bandwidth reaches more than 100M, the existing APD technology cannot achieve the power amplifier linear compensation of the hundreds of megabytes signal, and the interference between channels is serious.

The traditional digital 2G/3G/4G systems use digital serial optical signals to achieve the relay transmission between the access unit and the remote unit. For 5G applications, due to the radio frequency bandwidth reaching more than 100M and the application of 5G MIMO, the speed of the optical fiber link will reach tens to hundreds of Gigabytes, which makes great requirements on optical modules and fiber resources, which is difficult for operators to accept.

The implementation of the above-mentioned remote system is complicated, especially when there are many supported bands. There are connections of power, data, and radio frequency cables between each slave remote unit and the master remote unit, which causes the messy engineering connection, the large footprint, and high cost, which is not suitable for the large-scale promotion. Therefore, single analog or digital 2G/3G/4G distributed system cannot meet the requirements for 5G signal processing.

SUMMARY

In one aspect, the present disclosure provides a remote unit, and the remote unit includes an optical module configured to receive a signal from an access unit communicatively connected to the remote unit; a power distribution module connected to the optical module and configured to divide the signal received from the optical module into a first component and a second component, wherein the second component has a working band different from a working band of the first component; a first low noise and high-power amplifier connected to the power distribution module and configured to process the first component; and a second low noise and high-power amplifier connected to the power distribution module and configured to process the second component.

The remote unit disclosed according to certain embodiment(s) of the present disclosure uses two independent low noise and high-power amplifiers to process the input signal, and the input signal itself includes a multi-band signal, that is, the input signal includes both a first component working in the first band and a second component working in the second band different from the first band of the first component, two independent low noise and high-power amplifiers are used to separately process the first component and the second component, to enable process the first band of the first component and the second band of the second component based on corresponding band widths differently, so that the remote unit according to the present disclosure can process simultaneously the signal including a first component and a second component having different band-widths to improve the application scenario of the remote unit according to the present disclosure.

In certain embodiment(s) according to the present disclosure, the second low noise and high-power amplifier is configured to use a digital pre-distortion technology to process the second component. In this way, by introducing the digital pre-distortion (DPD) technology to process the second component, so that the second component whose working band is much larger than that of the first component can be processed efficiently, thereby improving the working band range of the processable signal of the remote unit according to the present disclosure.

In certain embodiment(s) according to the present disclosure, the optical module receives an analog signal output from the access unit. Compared with the traditional digital 2G/3G/4G system that employs a digital serial optical signal to achieve the relay transmission between the access unit and the remote unit, in this way the remote unit according to the present disclosure can be free from the expensive and possibly unrealizable requirement of the high speed digital optical module, thereby making the remote unit according to the present disclosure suitable for the requirements of the next-generation mobile communication technology.

In certain embodiment(s) according to the present disclosure, the first component includes at least one of a 2G signal, a 3G signal, and/or a 4G signal. In certain embodiment(s) according to the present disclosure, the second component includes a 5G signal and/or a 6G signal.

In certain embodiment(s) according to the present disclosure, the second low noise and high-power amplifier includes: a driving amplifier configured to amplify the second component; a digital processing module configured to perform noise reduction, filtering and pre-distortion processing on the amplified second component; a power amplifier configured to perform power amplification on the second component processed by the digital processing module; a circulator configured to isolate the second component amplified by the power amplifier; and a filter configured to filter the second component isolated by the circulator.

In certain embodiment(s) according to the present disclosure, the digital processing module is further configured to obtain the second component amplified by the power amplifier and the second component amplified by the driving amplifier, and a digital pre-distortion technology is performed on the second component amplified by the power amplifier and the second component amplified by the driving amplifier to implement pre-distortion compensation of a signal input to the power amplifier.

In certain embodiment(s) according to the present disclosure, the second low noise and high-power amplifier further includes a low-noise amplifier module, a second driving amplifier, and a radio frequency switch, where the filter is further configured to filter a received uplink signal, the filtered uplink signal is amplified by the low-noise amplifier module after passing through the circulator and the radio frequency switch, and fed into the digital processing module for noise reduction and filtering, and then amplified by the second driving amplifier to output.

In certain embodiment(s) according to the present disclosure, the power amplifier includes or is made of gallium nitride material.

A second aspect of the present disclosure relates to a multi-band distributed system, where the multi-band distributed system includes: an access unit; and the remote unit according to the first aspect of the present disclosure.

In certain embodiment(s) according to the present disclosure, the access unit includes a radio frequency card module for receiving and/or transmitting the second component, and the radio frequency card module is configured to receive a radio frequency signal of a band associated with the second component from a base station.

In certain embodiment(s) according to the present disclosure, the multi-band distributed system further includes: at least a base station; at least an optical fiber connected to the access unit and the remote unit; a combiner; and an antenna, where the combiner is configured to combine a plurality of first signals received from the remote unit and output a combined first signal to the antenna, or divide a second signal received from the antenna into a plurality of second divided signals and output the plurality of second divided signals to the remote unit, and the antenna is configured to radiate the combined first signal processed via the combiner or receive the second signal and output the second signal to the combiner.

Furthermore, a third aspect of the present disclosure relates to a signal processing method, and the signal processing method includes: S1: receiving a downlink signal from an access unit communicatively connected to the remote unit via an optical module; S2: dividing, by a power distribution module, the downlink signal received from the optical module into a first component and a second component, the second component having a working band different from a working band of the first component; S3, processing the first component via a first low noise and high-power amplifier; and S4, processing the second component via a second low noise and high-power amplifier.

In certain embodiment(s) according to the present disclosure, step S4 further includes: using digital pre-distortion technology to process the second component via the second low noise and high-power amplifier.

In certain embodiment(s) according to the present disclosure, step S1 further includes: receiving an analog signal output from the access unit via the optical module.

In certain embodiment(s) according to the present disclosure, the first component includes at least one of a 2G signal, a 3G signal, and/or a 4G signal, and/or the second component includes a 5G signal and/or a 6G signal.

In certain embodiment(s) according to the present disclosure, step S4 further includes: amplifying the second component via a driving amplifier; performing noise reduction, filtering, and pre-distortion processing on the amplified second component via a digital processing module; performing power amplification on the second component processed by the digital processing module via a power amplifier; isolating the second component amplified by the power amplifier via a circulator; and filtering the second component isolated by the circulator via a filter.

In certain embodiment(s) according to the present disclosure, step S4 further includes: obtaining the second component amplified by the power amplifier and the second component amplified by the driving amplifier via a digital processing module; and performing digital pre-distortion technology on the second component amplified by the power amplifier and the second component amplified by the driving amplifier to implement pre-distortion compensation of a signal (e.g., the second component) input to the power amplifier.

the remote unit disclosed according to certain embodiment(s) of the present disclosure uses two independent low noise and high-power amplifiers to process the input signal, and the input signal itself includes a multi-band signal, that is, the input signal includes both a first component working in the first band and a second component working in the second band different from the first band of the first component, two independent low noise and high-power amplifiers are used to separately process the first component and the second component, that is, to enable process the first band of the first component and the second band of the second component based on corresponding bandwidths differently, so that the remote unit according to certain embodiment(s) of the present disclosure can process simultaneously the signal including a first component and a second component having different band-widths to improve the application scenario of the remote unit according to the present disclosure.

BRIEF DESCRIPTION OF THE DRAWINGS

The embodiment(s) are shown and clarified with reference to the drawings. These drawings are used to clarify the basic principle, so that the aspects helpful for understanding the basic principle are shown. The drawings are not necessarily to scale. In the drawings, the same reference numerals indicate same or similar features.

Other features, characteristics, advantages and benefits of the present disclosure will become more apparent by referring to the following detailed description in conjunction with the accompanying drawings.

DETAILED DESCRIPTION

In the following detailed description of the preferred embodiment(s), reference will be made to the attached drawings constituting a part of the present disclosure. The accompanying drawings illustrate specific embodiment(s) capable of implementing the present disclosure by way of example. The exemplary embodiment(s) are not intended to be exhaustive of all embodiment(s) according to the present disclosure. It can be understood that without departing from the scope of the present disclosure, other embodiment(s) may be utilized, and structural or logical modifications may also be made. Therefore, the following detailed description is not restrictive, and the scope of the present disclosure is defined by the appended claims.

Figure 1:
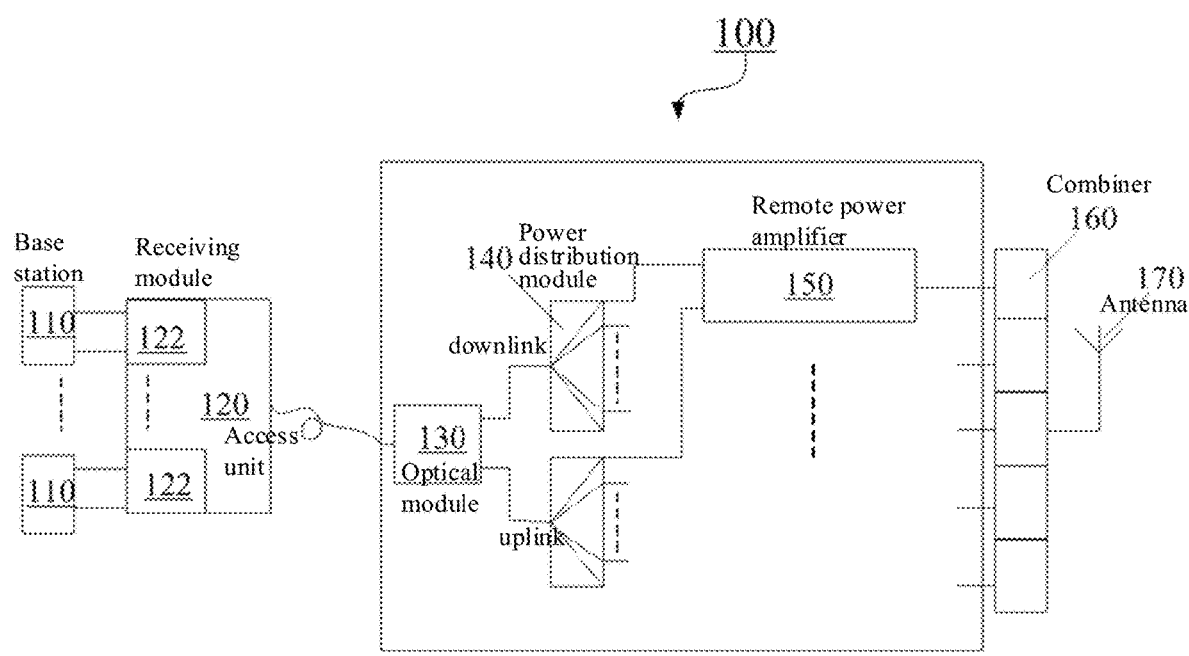
FIG. 1 shows a schematic view of a communication relay system according to the prior art.
Figure 2:
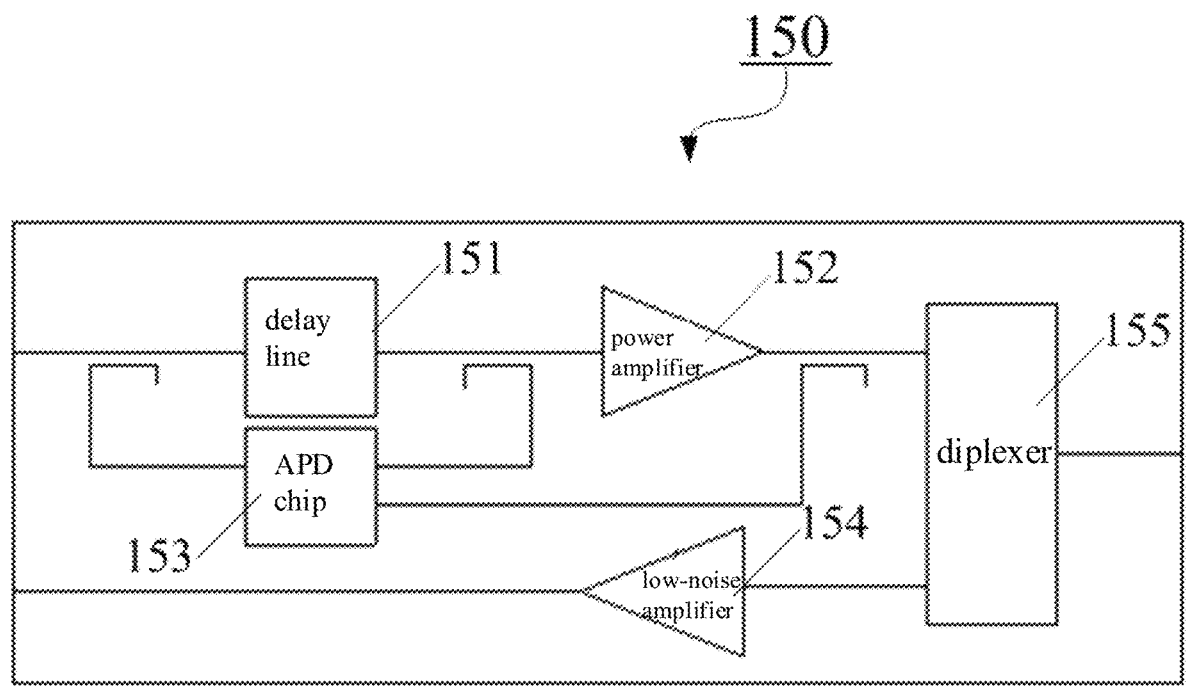
FIG. 2 shows a schematic view of a first low noise and high-power amplifier 150 of a remote unit used in the communication relay system according to the prior art.

FIG. 1 shows a view of a communication relay system according to the prior art, and FIG. 2 shows a view of a first low noise and high-power amplifier 150 of a remote unit used in the communication relay system according to the prior art. It can be seen from FIGS. 1 and 2 that in the traditional communication relay system 100, that is, the access unit 120 of the traditional analog 2G/3G/4G system 100 receives downlink signals from the base stations 110 separately by means of two receiving modules 122, and then the downlink signals are transmitted to the optical module 130 through optical fiber transmission, and then distributed to the corresponding remote power amplifier 150 via the power distribution module 140, at this time, the power distribution module 140 only plays the role of power distribution, and the subsequent remote power amplifiers 150 having the same structure which all use the APD (Analog Pre-distortion) technology to ensure system linearity index, and to avoid channel interference, the signals amplified by a plurality of remote power amplifiers 150 are radiated by means of the antenna 170 after being processed via the combiner 160. It can be further seen from FIG. 2 that in the remote power amplifier 150 herein, the signal is firstly processed by the delay line 151 and then output to the power amplifier 152. Here, the APD chip 153 will collect the signal input to the remote power amplifier 150 and the signal amplified by the power amplifier 152, and then the signal input to the power amplifier 152 is adjusted using the APD analog pre-distortion technology based on these signals, so that the power amplifier 152 achieves linear amplification, and then output to the next stage via the diplexer 155. For the uplink signal, it will be output through the diplexer 155 and the low-noise amplifier 154.

For 5G applications, because the working bandwidth may reach more than 100M, the existing APD technology may not achieve the power amplifier linear compensation of the hundreds of megabytes signal, and the interference between channels is serious. And if the traditional digital 2G/3G/4G system is used, as such a digital 2G/3G/4G system uses a digital serial optical signal to realize the relay transmission between the access unit and the remote unit. For 5G applications, the rate of the optical fiber link will reach tens to hundreds of Gigabytes, which makes great requirements on optical modules and fiber resources, which is difficult for operators to accept.

Figure 3:
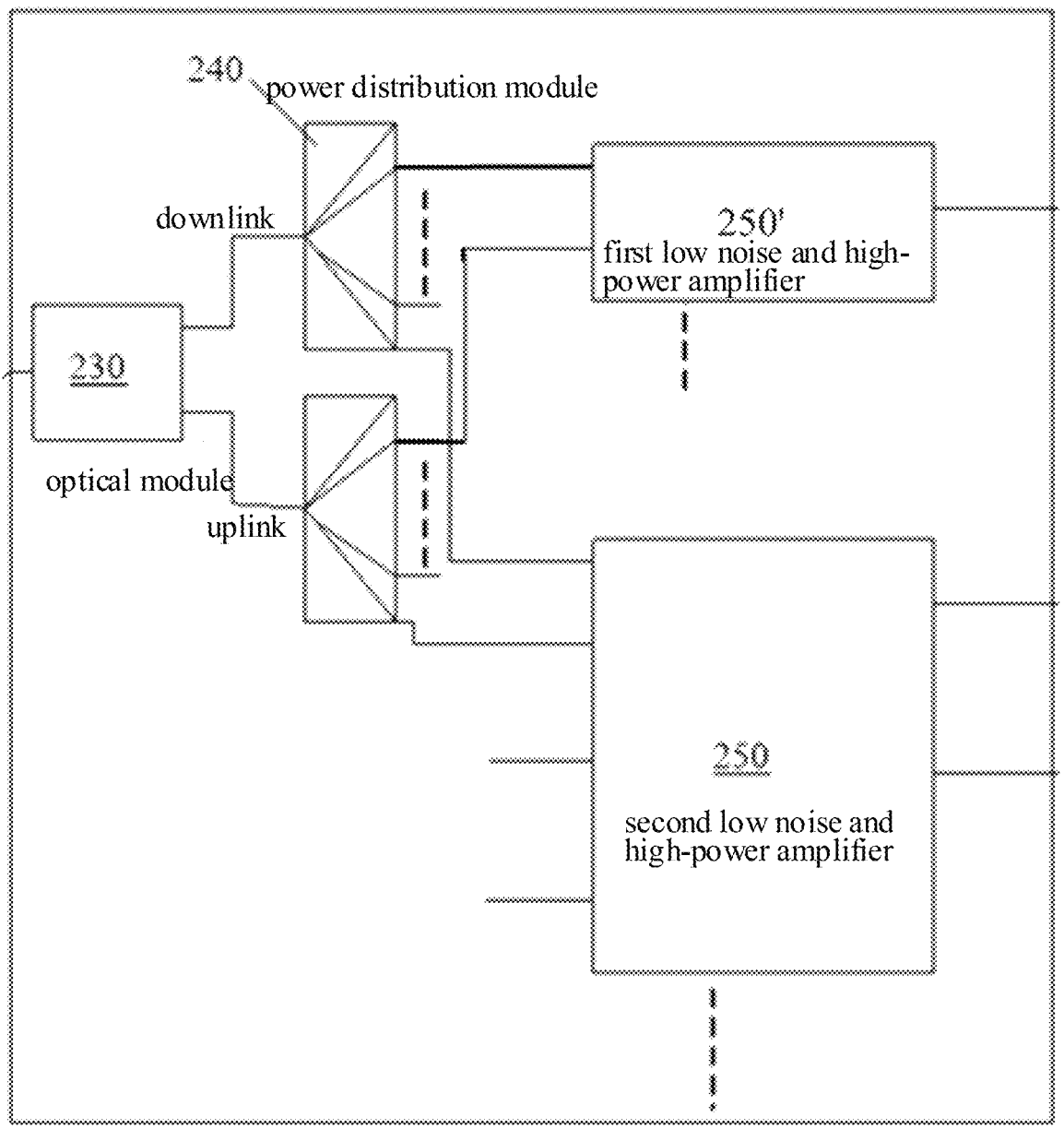
FIG. 3 shows a schematic view of a remote unit according to certain embodiment(s) of the present disclosure.

As a technical solution to the above-identified technical problems, the present disclosure in certain embodiment(s) provides modifying the structure of the remote unit to realize the application for 5G. By the way of the introduction of digital processing technology and algorithms, and the technology like noise reduction for analog optical modules, the strict requirements of indexes like ACLR (Adjacent Channel Leakage Power Ratio) and EVM (Error Vector Magnitude) under the conditions of multi-remote applications in the satellite network of the system are satisfied, the problem of a sharp decline of system performance of a single analog system under one-to-multiple condition is solved, and simultaneous coverage of 2G/3G/4G/5G multi-operator base station signals is achieved. Specifically, FIG. 3 shows a view of a remote unit according to certain embodiment(s) of the present disclosure. It can be seen from FIG. 3 that a remote unit is proposed in the present disclosure, the remote unit includes an optical module 230 configured to receive a signal from an access unit (e.g., the access unit 220 in FIG. 5) communicatively connected to the remote unit; in certain embodiment(s), the optical module 230 receives an analog signal output from the access unit 220. In certain embodiment(s), the optical module 230 also converts the received optical signal in the form of analog signal into an electrical signal. Compared with the traditional digital 2G/3G/4G system that uses digital serial optical signals to implement the relay transmission between the access unit 110 and the remote unit, in this way the remote unit according to the present disclosure can be free from the expensive and possibly unrealizable requirement of the high speed digital optical module, thereby making the remote unit according to the present disclosure suitable for the requirements of the next-generation mobile communication technology.

In certain embodiment(s), the remote unit according to the present disclosure further includes a power distribution module 240 connected to the optical module 230 and configured to divide the signal received via the optical module 230 into a first component and a second component, the second component having a working band different from that of the first component. Furthermore, the remote unit according to In certain embodiment(s) of the present disclosure further includes a first low noise and high-power amplifier 250' and a second low noise and high-power amplifier 250. The first low noise and high-power amplifier 250' is connected to the power distribution module 240 and is configured to process the first component, and the second low noise and high-power amplifier 250 is connected to the power distribution module 240 and is configured to process the second component. The remote unit disclosed according to the present disclosure uses two independent low noise and high-power amplifiers 250' and 250 to process the input signal, and the input signal itself includes a multi-band signal, that is, the input signal includes both the first component working in the first band, and the second component working in the second band different from the first band of the first component, two independent low noise and high-power amplifiers are used to separately process the first component and the second component, to enable process the first band of the first component and the second band of the second component based on corresponding band widths differently, so that the remote unit according to the present disclosure can process simultaneously the signal including a first component and a second component having different band-widths to improve the application scenario of the remote unit according to the present disclosure. In certain embodiment(s), the second low noise and high-power amplifier 250 is configured to use a digital pre-distortion technology to process the second component. In this way, by introducing the digital pre-distortion (DPD) technology to process the second component, the second component whose working band is much larger than that of the first component can be processed efficiently, thereby improving the working band range of the processable signal of the remote unit.

To the development of new mobile communication technologies, the first component can be, for example, a 4G and pre-4G communication signal component, and the second component can be, for example, a 5G and post-5G communication signal component. In certain embodiment(s) according to the present disclosure, the first component further includes at least one of a 2G signal, a 3G signal, and/or a 4G signal. In certain embodiment(s) according to the present disclosure, the second component includes 5G signals and/or 6G signals and possibly signals with higher bandwidth.

Figure 4:
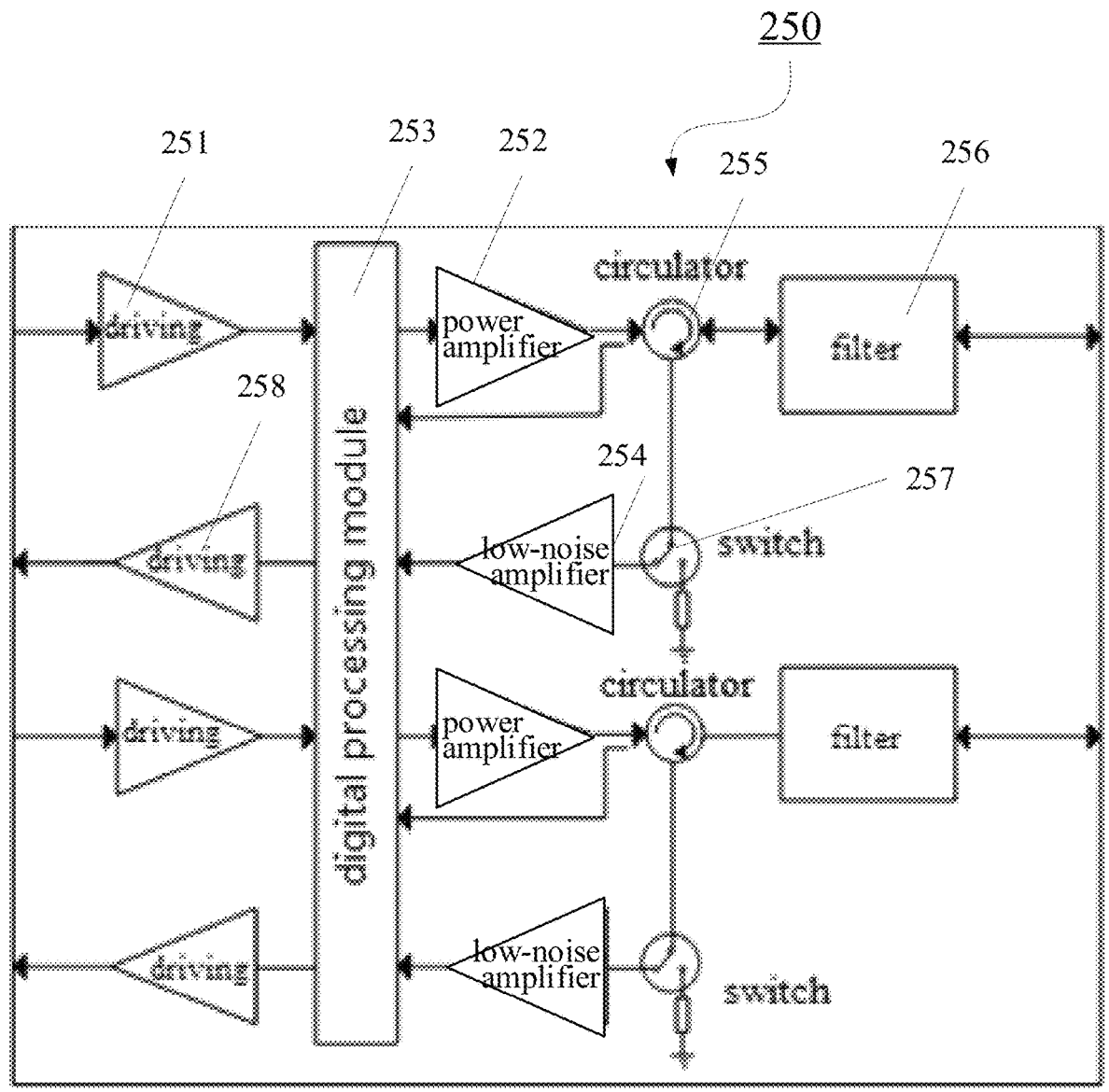
FIG. 4 shows a schematic view of a second low noise and high-power amplifier 250 used in the remote unit shown in FIG. 3 according to certain embodiment(s) the present disclosure.

The components of the second low noise and high-power amplifier 250 according to the present disclosure will be described in detail below with reference to FIG. 4. FIG. 4 shows a view of the second low noise and high-power amplifier 250 used in the remote unit shown in FIG. 3 according to the present disclosure. It can be seen from FIG. 4 that the second low noise and high-power amplifier 250 includes:

a driving amplifier 251 configured to amplify the second component;

a digital processing module 253 configured to perform noise reduction, filtering and pre-distortion processing on the amplified second component;

a power amplifier 252 configured to perform power amplification on the second component processed by the digital processing module 253;

a circulator 255 configured to isolate the second component amplified by the power amplifier 252; and a filter 256 configured to filter the second component isolated by the circulator 255.

According to certain embodiment(s) shown in FIG. 4, the digital processing module 253 is further configured to obtain the second component amplified by the power amplifier 252 and the second component amplified by the driving amplifier 251, and a digital pre-distortion technology is performed on the second component amplified by the power amplifier and the second component amplified by the driving amplifier to implement pre-distortion compensation for the signal (e.g. the second component) input to the power amplifier 252.

According to certain embodiment(s) shown in FIG. 4, the second low noise and high-power amplifier 250 further includes a low-noise amplifier module 254, a second driving amplifier 258, and a radio frequency switch 257, where the filter 256 is further configured to filter a received uplink signal, the filtered uplink signal is amplified by the low-noise amplifier module 254 after passing through the circulator 255 and the radio frequency switch 257, and fed into the digital processing module 253 for noise reduction and filtering, and then amplified by the second driving amplifier 258 to output. Since the lower part of the embodiment(s) shown in FIG. 4 has the same operating mechanism as that of the upper part, it will not be repeated here. However, those skilled in the art from FIG. 4 may understand that the same modules of the upper and lower two groups share a digital processing module 253, which because the processing capability and processing efficiency of the digital processing module 253 using the DPD digital pre-distortion technology are improved highly compared with that of using the APD analog pre-distortion technology, so that the same modules of two or more groups share a digital processing module 253. This type of sharing will be further clarified in FIG. 6 below.

In certain embodiment(s), to realize the ultra-high bandwidth amplification function for mobile communication technologies such as 5G, In certain embodiment(s) according to the present disclosure, the power amplifier 252 can be made of, for example, gallium nitride material. The digital processing module 253 in this solution uses an integrated TRX chip to improve the single-board integration, uses a GaN power amplifier 252 to support ultra-wideband amplification, and uses the digital pre-distortion technology to achieve linear amplification of ultra-wideband signals under lower energy consumption conditions, and achieve the compatible design of the 5G 2T2R low noise and high-power amplifier under the compatible condition with the original 4G power amplifier low-noise amplifier structure and size. The needs of operators for simultaneous coverage of 2G/3G/4G/5G are satisfied by configuring 2G/3G/4G/5G low noise and high-power amplifiers in a set of high-power remote units simultaneously, for 5G, there is no need to add new fiber resources, which saves CAPEX expenses. The efficiency of the low noise and high-power amplifier improves about 50% higher than that of the 2G/3G/4G module, which increases the product density, and the low noise and high-power amplifier can support the application requirements of 5G 4T4R in a remote system.

Figure 5:
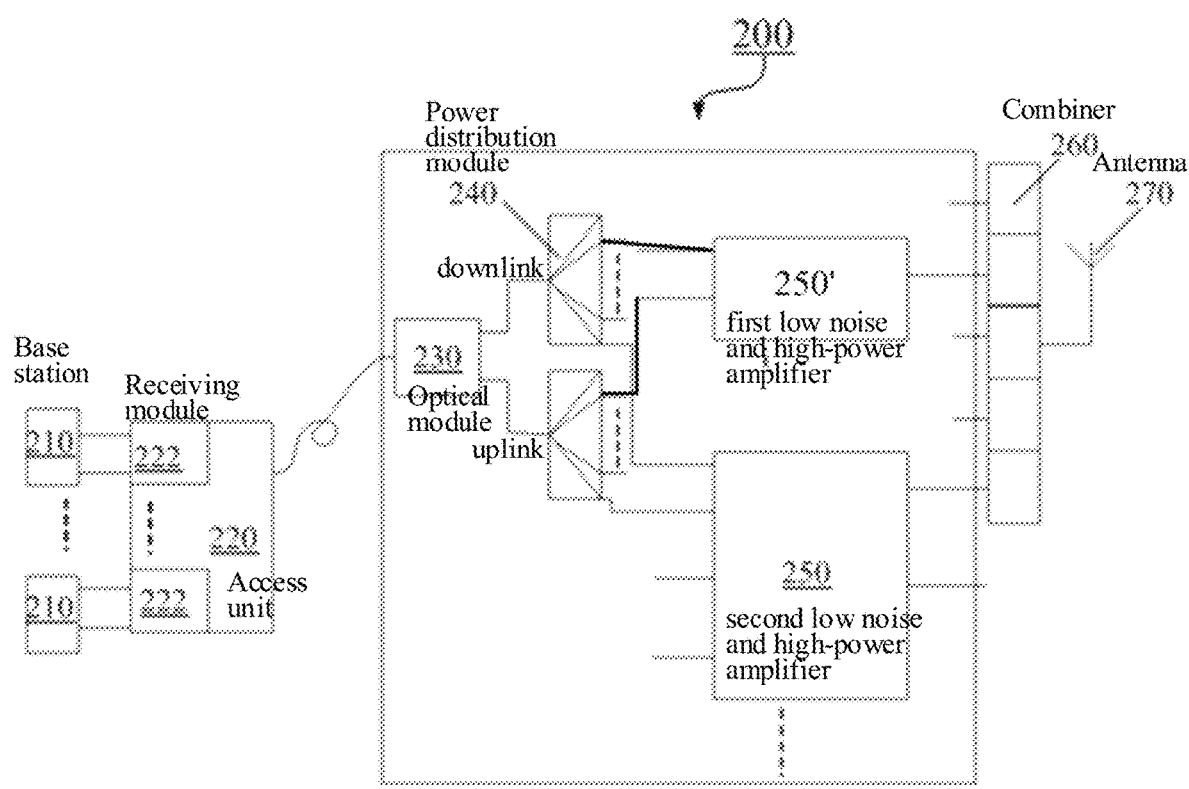
FIG. 5 shows a schematic view of a multi-band distributed system 200 according to certain embodiment(s) of the present disclosure.

The structure of the remote unit proposed according to the present disclosure has been introduced above, and the multi-band distributed system using the remote unit will be introduced below in conjunction with FIGS. 5 and 6. FIG. 5 shows a view of a multi-band distributed system 200 according to certain embodiment(s) of the present disclosure. It can be seen from FIG. 5 that the multi-band distributed system 200 includes:

an access unit 220; and the remote unit according to the first aspect of the present disclosure.

In certain embodiment(s) according to the present disclosure, the access unit includes a radio frequency card module 222 for receiving and/or transmitting the second component (for example, the radio frequency card module 222 in the lower left corner of the access unit 220 in FIG. 5), and the radio frequency card module 222 is configured to receive a radio frequency signal of the band associated with the second component from the base station 210. In the remote unit proposed according to the present disclosure, two independent low noise and high-power amplifiers 250' and 250 are used to process the input signal, and the input signal itself includes a multi-band signal, that is, the input signal includes both the first component working in the first band and the second component working in the second band different from the first band of the first component, by using two independent low noise and high-power amplifiers 250' and 250 respectively to process the first component and the second component, the first band of the first component and the second band of the second component can be processed differently, for example, based on the band widths thereof, so that the remote unit according to the present disclosure can process the signal including the first component and the second component with different band widths simultaneously to improve the application scenario of the remote unit according to the present disclosure.

In certain embodiment(s) according to the present disclosure, the multi-band distributed system further includes:

At least one base station, for example, two base stations in FIG. 5, that is, the two base stations 210 shown, additionally or alternatively, the two base stations 210 include a base station corresponding to multiple standards of one or more operators; here, those skilled in the art should understand that the two base stations here are only exemplary and not restrictive, the multi-band distributed system according to the present disclosure can include only one base station or more than two base stations. If only one base station is included, then the base station will support multiple communication modes with different standards, for example, the one base station supports 2G, 3G, 4G, and 5G wireless communications at the same time.

In addition, the multi-band distributed system according to the present disclosure can also include:

- at least one optical fiber shown as a connection between the access unit 220 and the optical module 230, and the at least one optical fiber connects to the access unit and the remote unit;
- a combiner 260; and
- an antenna 270,
- where, the combiner 260 is configured to combine multiple signals received from the remote unit and output them to the antenna 270, or divide the signal received from the antenna 270 into multiple signals and output them to the remote unit, and the antenna 270 is configured to radiate the signals processed via the combiner 260 or receive the signals and output them to the combiner 260.

Figure 6:
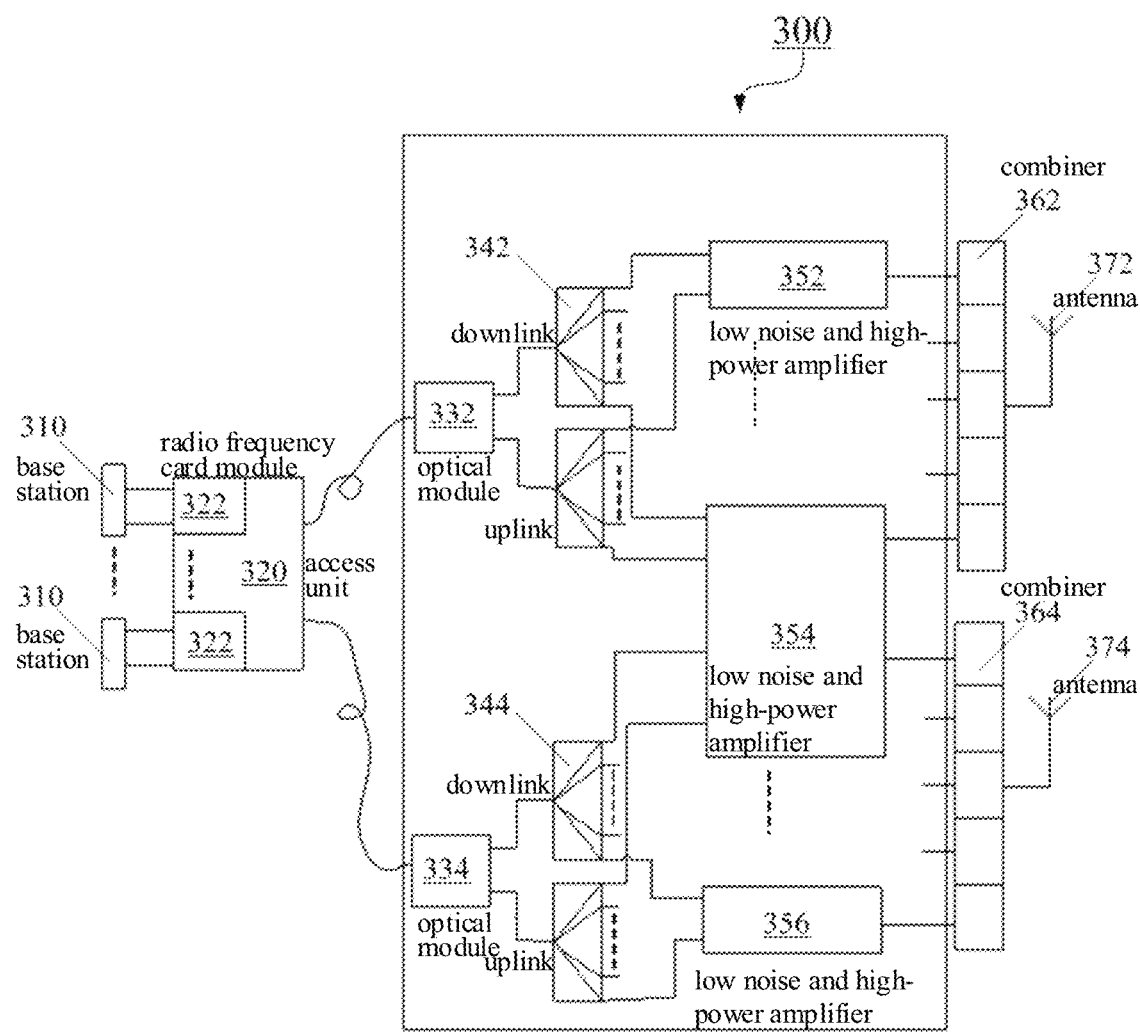
FIG. 6 shows a schematic view of a multi-band distributed system 300 according to certain embodiment(s) of the present disclosure.

FIG. 6 shows a view of a multi-band distributed system 300 according to certain embodiment(s) of the present disclosure. It can be seen from FIG. 6 that the multi-band distributed system 300 includes:

- an access unit 320; and
- The remote unit according to the first aspect of the present disclosure.

In certain embodiment(s) according to the present disclosure, the access unit includes a radio frequency card module 322 for receiving and/or transmitting the second component (for example, the radio frequency card module 322 in the lower left corner of the access unit 320 in FIG. 6), the radio frequency card module 322 is configured to receive/transmit a radio frequency signal of the band associated with the second component from/to the base station 310. In the remote unit proposed according to the present disclosure, two independent low noise and high-power amplifiers 352 and 354 are used to process the input signal, The example shown in FIG. 6 also includes another additional low noise and high-power amplifier 356 whose structure is similar to that of the low noise and high-power amplifier 352, the reason why two low noise and high-power amplifiers 352 and 356 and only another low noise and high-power amplifier 354 are shown is the low noise and high-power amplifier 354 can realize multiplexing of multiple signals, as previously clarified with reference to FIG. 4, the low noise and high-power amplifier 354 can include, for example, two sets of power amplifier low-noise amplifier sub-modules which can share the same digital processing module. The analog signal input to the optical module 332 or the optical module 334 itself includes a multi-band signal, that is, the input signal includes both the first component working in the first band and the second component working in the second band different from the first band of the first component, two independent low noise and high-power amplifiers are used to separately process the first component and the second component, to process the first band of the first component and the second band of the second component based on differences between the first and the second band widths, so that the remote unit according to the present disclosure can process simultaneously the signal including a first component and a second component having different band-widths to improve the application scenario of the remote unit according to the present disclosure.

In certain embodiment(s) according to the present disclosure, the multi-band distributed system 300 further includes:

- a plurality of base stations, such as a plurality of base stations 310 shown in FIG. 6, additionally or alternatively, the plurality of base stations 310 include base stations with multiple standards corresponding to one or more operators;
- at least one optical fiber, including two optical fibers in the example shown in FIG. 6, the two optical fibers are shown as connections between the access unit 320 and the optical module 332 and between the access unit 320 and the optical module 334, and the two optical fibers are connected to the access unit 320 and the optical modules 332 and 334 of the remote unit;
- combiners 362 and 364; and
- antennas 372 and 374,
- where the combiners 362 and 364 are configured to combine a plurality of first signals received from the remote unit and output a combined first signal to the antennas 372 and 374, or divide a second signal received from the antennas 372 and 374 into a plurality of second divided signals and output the second divided signals to the remote unit, and the antennas 372 and 374 are configured to radiate the first combined signal processed by the combiners 362 and 364 or receive the second signal and output the second signal to the combiners 362 and 364.

Figure 7:
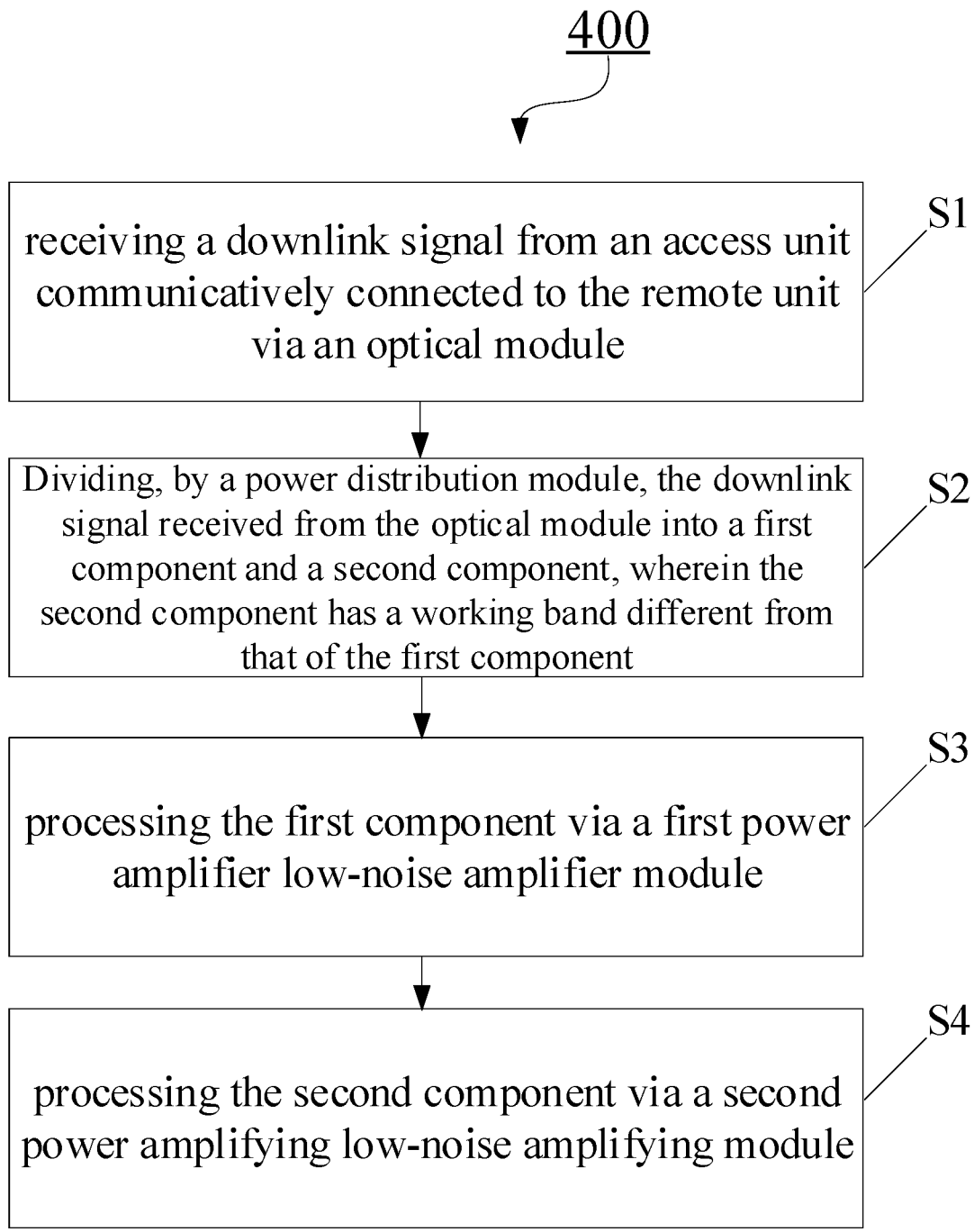
FIG. 7 shows a schematic flowchart of a signal processing method 400 according to certain embodiment(s) of the present disclosure.

FIG. 7 shows a flowchart of a signal processing method 400 according to certain embodiment(s) of the present disclosure. It can be seen from FIG. 7 that the signal processing method 400 involved in the third aspect of the present disclosure includes at least the following four steps, namely:

- Step S1, receiving a downlink signal from an access unit communicatively connected to the remote unit via an optical module;
- Step S2, dividing, by a power distribution module, the downlink signal received via the optical module into a first component and a second component, the second component having a working band different from that of the first component via;
- Step S3, processing the first component via a first low noise and high-power amplifier; and
- Step S4, processing the second component via a second low noise and high-power amplifier.

In certain embodiment(s) according to the present disclosure, step S4 further includes:

using digital pre-distortion technology to process the second component via the second low noise and high-power amplifier.

In certain embodiment(s) according to the present disclosure, step S1 further includes:

the optical module receives an analog signal output from the access unit.

In certain embodiment(s) according to the present disclosure, the first component further includes at least one of a 2G signal, a 3G signal, and/or a 4G signal, and/or the second component includes a 5G signal and/or 6G signal.

In certain embodiment(s) according to the present disclosure, step S4 further includes:
  amplifying the second component via a driving amplifier;
  performing noise reduction, filtering, and pre-distortion processing on the amplified second component via a digital processing module;
  performing power amplification on the second component processed by the digital processing module via a power amplifier;
  isolating the second component amplified by the power amplifier via a circulator; and
  filtering the second component isolated by the circulator via a filter.

In certain embodiment(s) according to the present disclosure, step S4 further includes:
  obtaining the second component amplified by the power amplifier and the second component amplified by the driving amplifier via a digital processing module; and
  employing a digital pre-distortion technology on the second component amplified by the power amplifier and the second component amplified by the driving amplifier to implement pre-distortion compensation of a signal input to the power amplifier.

According to certain embodiment(s) of the present disclosure, an analog remote plus digital distribution system is provided, where the high-power remote unit uses the DPD (digital pre-distortion) technology and the analog optical fiber remote technology to overcome the impact that the analog pre-distortion technology of the high-power remote power amplifier of the analog distributed system cannot achieve the pre-distortion correction of 5G ultra-wideband signals, to solve the problem of linearization of ultra-wideband power amplifiers and limited system transmission bandwidth, and meanwhile to overcome the bottleneck and the limitation of the relay transmission bandwidth of a single digital system, to satisfy the requirement of 5G MIMO applications, and to realize the coverage requirements for 2G/3G/4G/5G. For the new 5G coverage of 2G/3G/4G, there is no need to add new fiber resources and site resources, the network cost is low, the engineering connection is simple, and the system is smoothly upgraded.

Although different exemplary embodiment(s) of the present disclosure have been described, it is obvious to those skilled in the art that various changes and modifications can be made and realize one or some of the advantages of the present disclosure without departing from the spirit and scope of the present disclosure. For those skilled in the art, other components performing the same function can be replaced as appropriate. It should be understood that the features explained herein with reference to a particular figure can be combined with features of other figures, even in those scenarios where this is not explicitly mentioned. In addition, the method of the present disclosure can be implemented either in all software implementations using appropriate processor instructions or in a hybrid implementation using a combination of hardware logic and software logic to achieve the same result. Such modifications to the solution according to the present disclosure are intended to be covered by the appended claims.

What is claimed is:

1. A remote unit, comprising:
  an optical module configured to receive a signal from an access unit communicatively connected to the remote unit;
  a power distribution module connected to the optical module and configured to divide the signal received from the optical module into a first component and a second component, wherein the second component has a working band different from that of the first component;
  a first low noise and high-power amplifier connected to the power distribution module and configured to process the first component; and
  a second low noise and high-power amplifier connected to the power distribution module and configured to process the second component,
  wherein the second low noise and high-power amplifier comprises:
    a driving amplifier configured to amplify the second component;
    a digital processing module configured to perform noise reduction, filtering and pre-distortion processing on the amplified second component;
    a power amplifier configured to perform power amplification on the second component processed by the digital processing module;
    a circulator configured to isolate the second component amplified by the power amplifier; and
    a filter configured to filter the second component isolated by the circulator.

2. The remote unit according to claim 1, wherein the second low noise and high-power amplifier is configured to use a digital pre-distortion technology to process the second component.

3. The remote unit according to claim 1, wherein the optical module is configured to receive an analog signal output from the access unit.

4. The remote unit according to claim 1, wherein the first component includes at least one of a 2G signal, a 3G signal, or a 4G signal.

5. The remote unit according to claim 1, wherein the second component includes at least one of a 5G signal or a 6G signal.

6. The remote unit according to claim 1, wherein the digital processing module is further configured to obtain the second component amplified by the power amplifier and the second component amplified by the driving amplifier, and a digital pre-distortion technology is performed on the second component amplified by the power amplifier and the second component amplified by the driving amplifier to implement pre-distortion compensation of the second component input to the power amplifier.

7. The remote unit according to claim 1, wherein the second low noise and high-power amplifier further comprises a low-noise amplifier module, a second driving amplifier, and a radio frequency switch, wherein the filter is further configured to filter a received uplink signal, the filtered uplink signal is amplified by the low-noise amplifier module after passing through the circulator and the radio frequency switch, and fed into the digital processing module for noise reduction and filtering, and then amplified by the second driving amplifier to provide an amplified output signal.

8. The remote unit according to claim 1, wherein the power amplifier includes gallium nitride material.

9. A multi-band distributed system, wherein the multi-band distributed system comprises:
  an access unit; and
  a remote unit comprising:
    an optical module configured to receive a signal from the access unit communicatively connected to the remote unit;
    a power distribution module connected to the optical module and configured to divide the signal received from the optical module into a first component and a second component, wherein the second component has a working band different from that of the first component;
a first low noise and high-power amplifier connected to the power distribution module and configured to process the first component; and
a second low noise and high-power amplifier connected to the power distribution module and configured to process the second component,
wherein the second low noise and high-power amplifier comprises:
a driving amplifier configured to amplify the second component;
a digital processing module configured to perform noise reduction, filtering and pre-distortion processing on the amplified second component;
a power amplifier configured to perform power amplification on the second component processed by the digital processing module;
a circulator configured to isolate the second component amplified by the power amplifier; and
a filter configured to filter the second component isolated by the circulator.

10. The multi-band distributed system according to claim 9, wherein the access unit comprises a radio frequency card module configured to receive and/or transmit the second component, and the radio frequency card module is configured to receive a radio frequency signal of a band associated with the second component from a base station.

11. The multi-band distributed system according to claim 9, wherein the mufti-band distributed system further comprises:
at least one base station;
at least one optical fiber connected to the access unit and the remote unit;
a combiner; and
an antenna,
wherein the combiner is configured to combine a plurality of first signals received from the remote unit to obtain a combined first signal and output the combined first signal to the antenna, or divide a second signal received from the antenna into a plurality of second divided signals and output the plurality of second divided signals to the remote unit, and
the antenna is configured to radiate the combined first signal processed via the combiner or receive the second signal and output the second signal to the combiner.

12. A signal processing method, comprising:
receiving a downlink signal from an access unit communicatively connected to a remote unit via an optical module;
dividing, by a power distribution module, the downlink signal received from the optical module into a first component and a second component, wherein the second component has a working band different from that of the first component;
processing the first component via a first low noise and high-power amplifier; and
processing the second component via a second low noise and high-power amplifier, comprising: amplifying the second component via a driving amplifier;
performing noise reduction, filtering, and pre-distortion processing on the amplified second component via a digital processing module;
performing power amplification on the second component processed by the digital processing module via a power amplifier;
isolating the second component amplified by the power amplifier via a circulator; and
filtering the second component isolated by the circulator via a filter.

13. The signal processing method according to claim 12, wherein processing the second component comprises:
using digital pre-distortion technology to process the second component via the second low noise and high-power amplifier.

14. The signal processing method according to claim 12, wherein receiving the downlink signal comprises:
receiving an analog signal output from the access unit via the optical module.

15. The signal processing method according to claim 12, wherein: the first component includes at least one of a 2G signal, a 3G signal, or a 4G signal; and/or the second component includes at least one of a 5G signal or a 6G signal.

16. The signal processing method according to claim 12, wherein processing the second component comprises: obtaining the second component amplified by the power amplifier and the second component amplified by the driving amplifier via a digital processing module; and performing digital pre-distortion technology on the second component amplified by the power amplifier and the second component amplified by the driving amplifier to implement pre-distortion compensation of a signal input to the power amplifier.

* * * * *